E. M. ADAMS.
TUMBLER RINSER.
APPLICATION FILED JUNE 25, 1920.
1,367,342.
Patented Feb. 1, 1921.
2 SHEETS—SHEET 1.
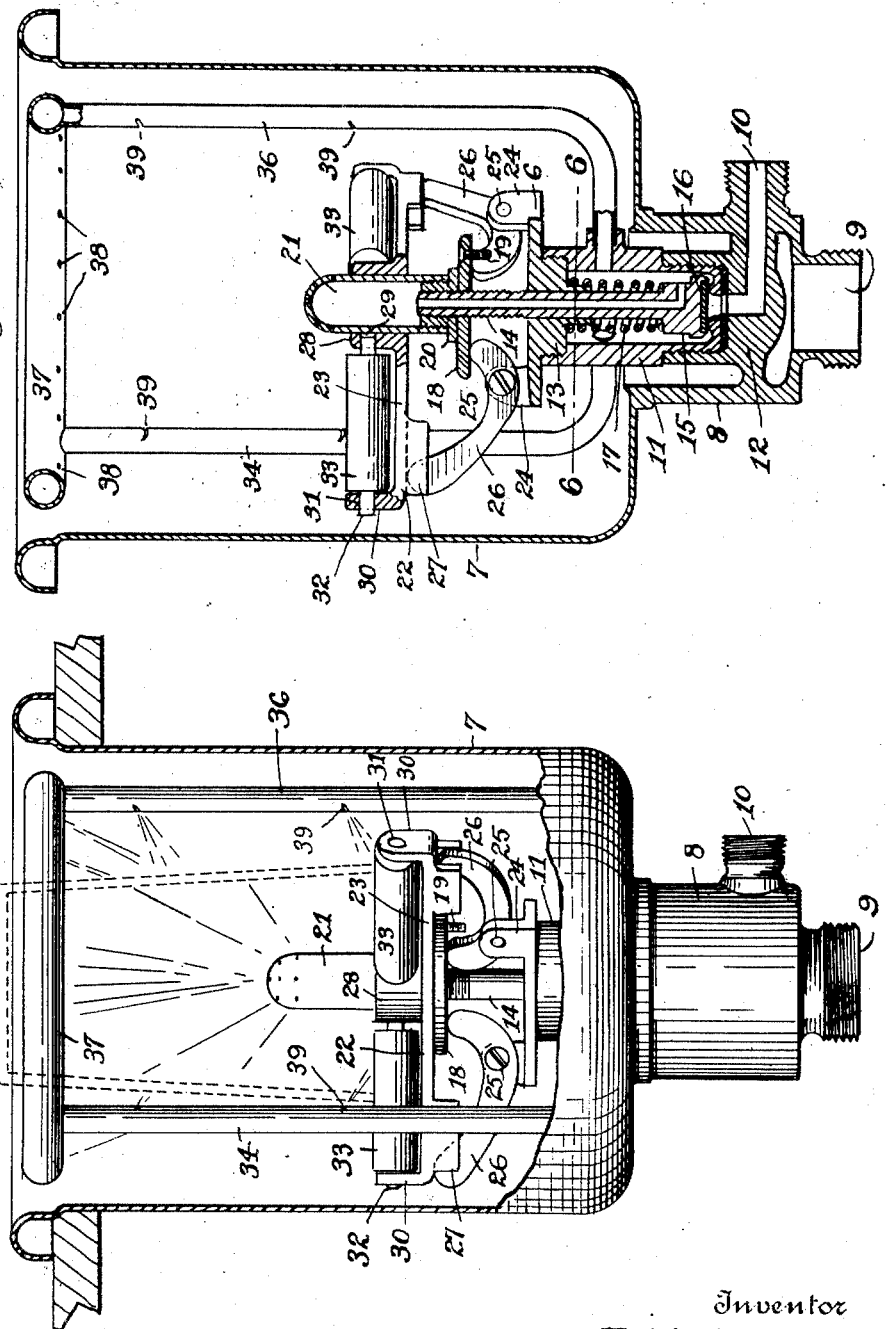
Inventor
E. M. Adams
By his Attorney
Wm. H. Reid.

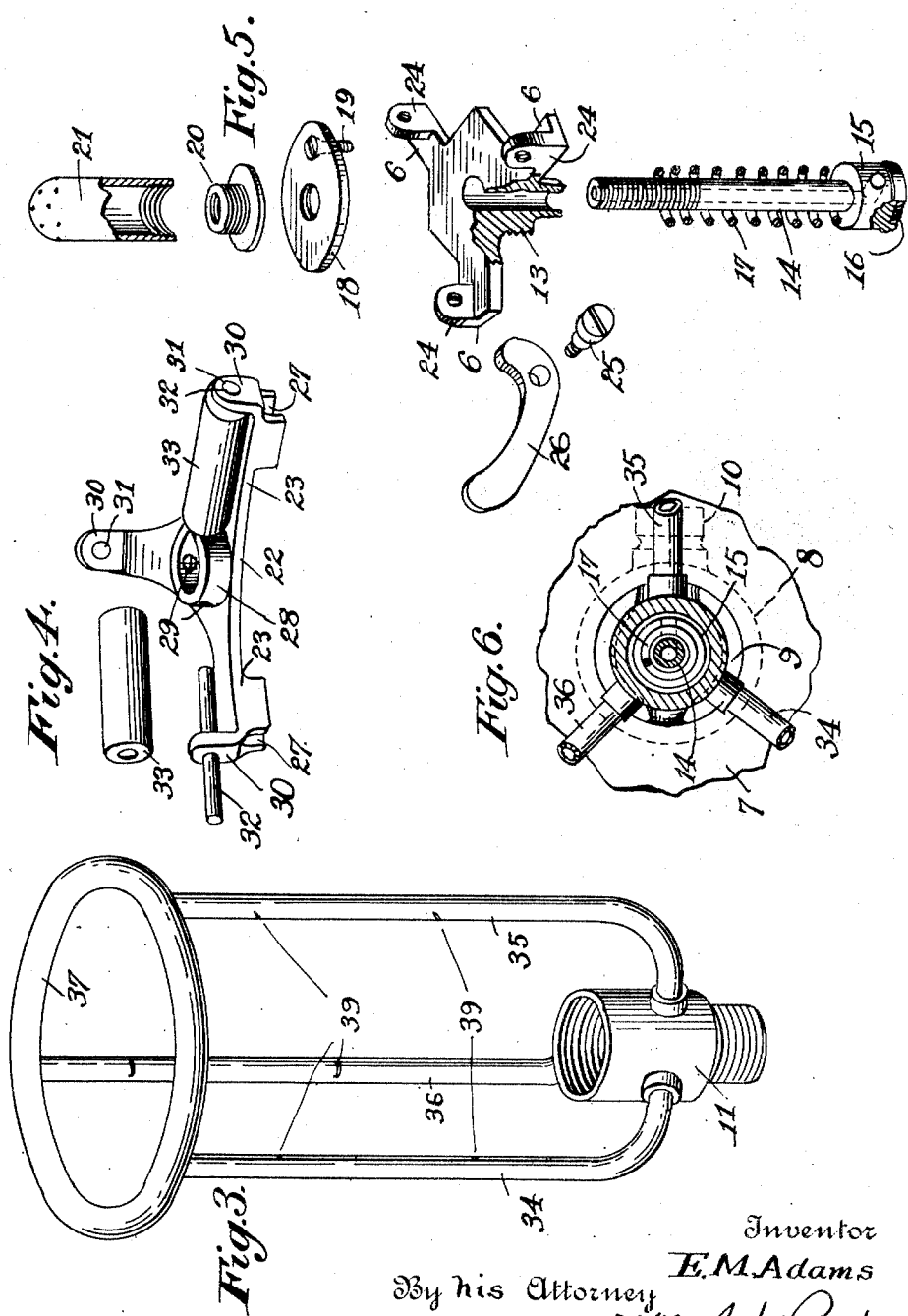

UNITED STATES PATENT OFFICE.

EDWARD M. ADAMS, OF NEW YORK, N. Y., ASSIGNOR TO MORRIS H. PETIGOR, OF NEW YORK, N. Y.

TUMBLER-RINSER.

1,367,342.  Specification of Letters Patent.  Patented Feb. 1, 1921.

Application filed June 25, 1920. Serial No. 391,620.

*To all whom it may concern:*

Be it known that I, EDWARD M. ADAMS, a citizen of the United States, and resident of New York city, county of New York, State of New York, have invented certain new and useful Improvements in Tumbler-Rinsers, of which the following is a specification.

This invention relates to devices of this class wherein an inverted tumbler is simply inserted in a bowl and pressed downwardly against a rest, the pressure of such operation causing a valve to open and water to be directed against the tumbler on its inner faces, and preferably also on the outer wall.

One object of the present invention is to provide an improved construction of the means for operating the valve to admit the flow of water; and also to provide for an adjustment in such parts that can be easily operated, yet will be retained in adjusted position.

A further object of the invention is to provide an improved form of rest frame for engaging the lower edge of the tumbler, that will present an efficient cushioned member to engage the tumbler edge and prevent defacement thereof.

In the accompanying drawings showing one embodiment of my invention, Figure 1 is a side elevation with the bowl broken away.

Fig. 2 is a vertical section through the device.

Fig. 3 shows the arrangement of pipes for directing the water on the outside of the tumbler.

Fig. 4 shows the rest frame.

Fig. 5 shows the valve tube, rest plate and nozzle, with connected parts.

Fig. 6 is a section on the line 6—6 shown in Fig. 2.

As set forth in the drawings the bowl 7 is secured to a base member 8, in the form of a hollow casting, provided with an outlet 9 at the bottom, and an inlet 10 at one side. The latter extends upwardly and terminates in a valve seat.

A valve casing 11, see Fig. 3, is screwed into the base, and has a valve seat 12 for the inlet. The top of the valve casing is closed with a disk 13 screwed therein, whose bore receives the tubular valve plunger 14 that slides therein and projects some distance above the casing top. The plunger has a head 15 on the lower end that constitutes a valve, and is recessed to receive a rubber disk 16, that is pressed down against the valve seat 12, by a coil spring 17 tensioned between the valve head and the top of the valve casing, as shown in Fig. 2. The tubular plunger has its bore deflected to one side in the valve head to receive water from the interior of the valve casing and permit it to pass up through the valve plunger. Obviously, when the valve plunger is moved upwardly water from the inlet 10 will pass into the valve casing, and up through the plunger, the valve being normally seated by the spring.

It will be further seen from Fig. 2 that water from the bowl can pass down around the valve casing and find exit through the outlet 9.

The upper part of the plunger 14 is screw threaded, and an adjusting disk 18 is mounted thereon, which is supplied with a stop pin or screw 19. A flanged collar 20 screws on the plunger above this disk, and acts as a lock nut. This threaded collar also receives the nozzle 21, that has small openings in the upper portion to provide streams of water to engage the inside of the tumbler, as indicated in Fig. 1, that will pass therethrough when the plunger is raised to open the valve as set forth.

To raise the valve plunger by bearing down on the tumbler, I provide a rest frame 22, that is placed on a set of levers which serve to raise the plunger on depression of the frame; as shown the rest frame 22 is in the form of a spider with three arms 23. The top disk 13 of the valve casing has three extensions 6 each having a threaded lug 24, to receive a pivot screw 25, on which a lever 26 swings; such levers being fulcrumed at their intermediate parts.

Each of the three arms 23 rests on one of the levers 26 that have socket portions 27 on their lower face to receive the levers, see Fig. 4.

The tumbler frame is further provided with cushioning means to engage the tumbler edge. At the center opening of the frame is a collar 28 projecting upwardly, containing three apertures 29 opposite the arms 23. Ears 30 projecting upward on the outer end of each arm, contain apertures 31, and rods 32 pass through these ears and into the apertures 29 in the collar. These rods receive tubes 33 of suitable resilient material such as soft rubber. The rods can be inserted from the outer portion, as indicated in Fig. 4, and passed through the rubber tubes, and into the collar aperture. The rods fit loosely in the apertures to rotate therein, and are retained by being a tight fit in the rubber tubes. This forms three roller bearings for the tumbler edge that are freely rotatable. When the tumbler is pressed downward it is naturally given a slight turn, that will cause a different surface of the rubber tube to be frequently presented to the tumbler edge, to prevent wear of the roller, that would result if the rubber cushion was immovable. Yet when it is desired to renew these rubber rollers, it is only necessary to withdraw the rod and replace a tube. It will be understood from Fig. 2 that the central opening of the frame 22 is a loose fit on the nozzle 21, and the frame is free to move downward to swing the levers 26. The inner ends of these levers engage the lower face of the disk 18, that as set forth is adjustably secured on the plunger 14. Therefore, bearing down on the frame by the tumbler will raise the inner ends of these levers and elevate the plunger and valve, to admit water into the valve casing, that will squirt out through the nozzle, as indicated in Fig. 1. This operation will compress the spring in the valve casing, that will seat the valve as soon as the pressure is relieved on the tumbler. It will be understood that the water passing into the tumbler will fall down in the bowl and pass out through the outlet 9, that can be connected with a suitable waste pipe. The inlet 10 is obviously connected with a water supply under pressure.

I further provide means for directing water against the outside of the tumbler, that is supplied from the valve casing 11. As shown three pipes 34, 35 and 36 connect with lateral openings in the valve casing, and pass upwardly, being connected with a tubular ring 37 at the upper end of the bowl. Each of these will receive water from the valve casing when the plunger valve is lifted, that will supply the ring 37, and the water will find outlet through small openings 38 in the lower part of the ring 37, that direct the water downwardly and inwardly against the outer wall of the tumbler, as indicated in Fig. 1. These upright pipes are provided with openings in their inner walls opposite the tumbler to direct streams of water on to the tumbler. As shown I form saw-kerfs 39 in these upright pipes extending at an angle to the pipes whereby a flat stream of water is directed against the tumbler.

It will thus be understood that a device of this character is extremely efficient in operation and will not tend to injure the tumblers, as a fresh cushioning surface is presented at each succeeding operation, also the rubber cushions can be easily and quickly replaced. The rest frame for the tumbler slides vertically on the plunger in contact with the levers, and can be lifted out from this normal position, without disconnecting any parts. Furthermore the entire valve device can be readily removed from the bowl by turning the upper ring 37 that is rigidly connected with the valve casing by the upright pipes. When wear occurs in any of the moving parts, especially the levers, the nozzle and collar 20 are screwed upwardly and the disk 18 can be screwed upward or downward as desired, and then the collar and nozzle screwed against the disk to lock it in position. Turning of this disk beyond a very short distance is prevented by reason of the screw 19 in the disk engaging the adjacent levers on each side thereof, so that the disk can not be turned any considerable distance until the levers are swung. The valve device including the levers is readily removed by unscrewing the top disk 13 of the valve casing. Thereupon adjustment of the disk, after loosening the collar and nozzle, is effected by turning the valve stem in the top disk 13. The rest disk 18 being prevented from turning by the screw 19 engaging the levers.

What I claim is:—

1. In a tumbler rinser, a bowl having a base member containing inlet and outlet passages a valve casing in the base for the inlet, a tubular plunger valve operating in the valve casing to control the inlet and projecting upwardly beyond the casing and screw threaded, a nozzle on the upper end of the plunger, a set of levers hinged on the casing top, a tumbler rest frame on the levers to swing them, a stop disk adjustably threaded on the plunger to engage the levers and raise the plunger and valve when the rest frame is depressed, said adjustable disk having locking means to prevent turning in use.

2. In a tumbler rinser, a bowl having a base member containing inlet and outlet passages a valve casing in the base for the inlet, a tubular plunger valve operating in the valve casing to control the inlet and projecting upwardly beyond the casing and screw threaded, a nozzle on the upper end of the plunger, a set of levers hinged on the casing top, a tumbler rest frame on the levers to swing them, a stop disk adjustably threaded on the plunger to engage the levers and raise the plunger and valve when the rest frame is depressed, said adjustable disk having locking means to prevent turning in use, comprising a lug on the disk engaging the levers.

3. In a tumbler washer, a valve casing, a valve working in the casing and having a tubular stem projecting above the casing, a nozzle on the upper end of the stem, a series of levers having fixed pivots on the casing top, a tumbler frame engaging the outer ends of the levers to swing the levers when depressed, and a disk on the valve stem engaging the inner ends of the levers to raise the valve stem on depression of the frame.

4. In a tumbler washer, a valve casing, a valve working in the casing and having a tubular stem projecting above the casing, a nozzle on the upper end of the stem, a series of levers having fixed pivots on the casing connected with the valve stem to raise the stem when depressed, and a tumbler frame in the form of a spider having radial arms with sockets on the lower face to engage the ends of said levers.

5. In a tumbler washer, a valve casing, a valve working in the casing and having a tubular stem projecting above the casing, a nozzle on the upper end of the stem, a series of levers having fixed pivots on the casing top, a tumbler frame engaging the outer ends of the levers to swing the levers when depressed, and a disk on the valve stem engaging the inner ends of the levers to raise the valve stem on depression of the frame, said disk being adjustably secured to the stem to vary the normal position of the levers and frame.

6. In a tumbler washer, a valve casing, a valve working in the casing and having a tubular stem projecting above the casing, a nozzle on the upper end of the stem, a series of levers having fixed pivots on the casing top, a tumbler frame engaging the outer ends of the levers to swing the levers when depressed, and a disk on the valve stem engaging the inner ends of the levers to raise the valve stem on depression of the frame, said disk being threaded on the stem for adjustment, said nozzle being threaded on the stem to secure the disk in adjusted position.

Signed at New York city, N. Y., on May 8th, 1920.

EDWARD M. ADAMS.